(12) United States Patent
Ohnishi (10) Patent No.: US 6,269,371 B1
(45) Date of Patent: Jul. 31, 2001

(54) COMPUTER SYSTEM, AND FILE RESOURCES SWITCHING METHOD APPLIED TO COMPUTER SYSTEM

(75) Inventor: Hajime Ohnishi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/156,870

(22) Filed: Sep. 18, 1998

(30) Foreign Application Priority Data

Feb. 27, 1998 (JP) .................................................. 10-047287

(51) Int. Cl.[7] ...................................................... G06F 17/30
(52) U.S. Cl. ................................ 707/10; 707/1; 707/201; 707/205; 717/1; 711/133
(58) Field of Search ................................. 707/1, 10, 102, 707/200, 202, 204, 201, 526; 717/1, 114, 129, 133, 141; 345/333; 711/133; 348/6

(56) References Cited

U.S. PATENT DOCUMENTS

| | | | | |
|---|---|---|---|---|
| 5,721,916 | * | 2/1998 | Pardikar ................................ | 707/201 |
| 5,781,909 | * | 7/1998 | Logan et al. .......................... | 707/200 |
| 5,828,876 | * | 10/1998 | Fish et al. ................................. | 707/1 |
| 5,893,116 | * | 4/1999 | Simmonds et al. ................... | 707/201 |
| 5,893,920 | * | 4/1999 | Shaheen et al. ...................... | 711/133 |
| 5,905,492 | * | 5/1999 | Straub et al. ......................... | 345/333 |
| 5,937,421 | * | 8/1999 | Petrov et al. ......................... | 707/526 |
| 5,991,771 | * | 11/1999 | Falls et al. ............................. | 707/202 |
| 6,021,413 | * | 2/2000 | Vaduvur et al. ...................... | 707/201 |
| 6,091,441 | * | 7/2000 | Al-Araji et al. .......................... | 348/6 |
| 6,106,570 | * | 9/1998 | Mizuhara ................................. | 717/1 |

FOREIGN PATENT DOCUMENTS 8-255106    10/1996   (JP) .

* cited by examiner

Primary Examiner—Hosain T. Alam
Assistant Examiner—Anh Ly
(74) Attorney, Agent, or Firm—Finnegan, Henderson, Farabow, Garrett & Dunner L.L.P.

(57) ABSTRACT

A computer system comprising a server computer and a network computer operating upon downloading programs and data necessary for data processing from the server. The network computer comprises a local storage device in which at least a part of resources including the programs and data stored in a file system of the server are stored as a replica, determination means for determining a connection state to the server, and file system allocation means for selectively allocating the file system of the server and a local file system stored as a replica in the local storage device to the network computer in accordance with the determination result made by the determination means so that a common file access pass to both the file system of the server and the local file system of the local storage device can be used.

18 Claims, 7 Drawing Sheets

IN OFFICE MODE

COMPUTER SYSTEM, AND FILE RESOURCES SWITCHING METHOD APPLIED TO COMPUTER SYSTEM

BACKGROUND OF THE INVENTION

The present invention relates to a computer system which operates upon downloading programs and data from a server (server computer) via a network, and a file resources switching method applied to the computer system.

This application is based on Japanese Patent Application No. 10-047287 filed on Feb. 27, 1998, the content of which is incorporated herein by reference.

In recent years, new computer architectures called Network Computers have been developed instead of personal computers.

The network computer is designed to be used based on connection to a network. All programs and data necessary for data processing are downloaded from a server via a network. Therefore, each network computer operating as a client computer need not have programs and data, and can flexibly cope with, e.g., updating of an Operating System (OS) and application programs. As a result, total costs of ownership can be drastically reduced.

However, as described above, the network computer is designed to be used based on connection to a network, and is not usually designed to be used in a mobile environment where the computer is disconnected to the network. It is, therefore, necessary to develop a new network computer which can perform the same operations as in the online state in which the computer is connected to the network even if the computer operates in the offline state in which the computer is not connected to the network.

In order to realize a network computer which can be used in a mobile environment, it is necessary to provide a local storage, in which copies of resources on the server necessary for operating in the offline state are stored, in the network computer and to enable the network computer to operate using the local storage device.

In this case, however, the file system to be accessed differs between the online state and the offline state. As a result, it is necessary to clearly distinguish the network file system of the server from the local file system of the local storage. For this reason the user or the application program of the network computer must explicitly designate a file system to be accessed while being aware of the state of the connection of the network computer to a network. Furthermore, the network file system of the server cannot be accessed in the same procedures as those of the local file system of the local storage.

Note that "file system" means "hierarchy structured file set" and "file system" will be used based on this meaning hereinafter.

BRIEF SUMMARY OF THE INVENTION

It is the first object of the present invention to provide a computer system capable of efficiently using a network computer for mobile uses.

It is the second object of the present invention to provide a file resources switching method applied to the computer system.

It is the third object of the present invention to provide a computer program product used in the computer system.

The first object is achieved by the following computer system. That is, the computer system of the present invention comprises a server computer; and a network computer operating upon downloading programs and data necessary for data processing from the server computer, wherein the network computer comprising: a local storage device in which at least a part of resources including the programs and data stored in a file system of the server computer are stored as a replica; determination means for determining a connection state of the network computer to the server computer; and file system allocation means for selectively allocating the file system of the server computer and a local file system stored as a replica in the local storage device to the network computer in accordance with the determination result made by the determination means.

The second object is achieved by the following file resources switching method. That is, the file resource switching method of the present invention, applied to a network computer, the network computer having a local storage device in which at least a part of resources including programs and data stored in a file system of a server computer are stored as a replica by downloading the resources from the server computer, the method comprising: a determination step of determining a connection state of the network computer to the server computer, and a step of selectively allocating the file system of the server computer and a local file system stored as a replica in the local storage device to the network computer in accordance with the determination result made by the determination step.

In this computer system, in accordance with whether the network computer is in an online mode connection state in which the network computer is connected to the server or in a mobile mode connection state in which the network computer is not connected to the server, a file system allocated to the network computer is automatically switched. Therefore, the user or application program does not have to be aware of a file system to be accessed. In addition, the user or application program can use a common file access pass to both the file system of the server and the local file system of the local storage device. As a result, it is possible to perform processing using the file resources on the server when the network computer is in an online mode connection state, and processing using replicas of the file resources in the local storage device when the network computer is in a mobile mode connection state. A computer system suitable for realizing a network computer for mobile uses is thus provided.

The computer system of the present invention comprises a server computer; and a network computer operating upon downloading programs and data necessary for data processing from the server computer, wherein the network computer comprising: a local storage device in which at least a part of resources including the programs and data stored in a file system of the server computer are stored as a replica; directory mount control means for mounting the file system of the server computer as a home directory of file resources and mounting a local file system stored as a replica in the local storage device as a replica directory, when the network computer is in a PPP connection state in which the network computer is connected to the server computer by PPP, determination means for determining whether a software to be accessed is stored in the local file system stored in the local storage device as a replica, and file access means for accessing the local file system of the local storage device or the file system of the server computer in accordance with a determination result made by the determination means.

The network computer for mobile uses may be connected to the server via a network outside the office. In this case, communication speed is slowed down. Due to this, if a software to be accessed is stored in the local file system of the local storage device, it is preferable to access the local file system. Thus, by automatically switching the file system to be accessed in accordance with whether a software, designated by a file access pass included in a file access request from the user or the application program, is stored, it is possible to select the most suitable file system while the user or the application program of the computer system is not at all aware of a file system to be accessed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be described below with reference to the accompanying drawings.
An Example of System Arrangement of the Computer System FIG. 1 shows an example of the system arrangement of a computer system in accordance with an embodiment of the present invention.

Figure 1:
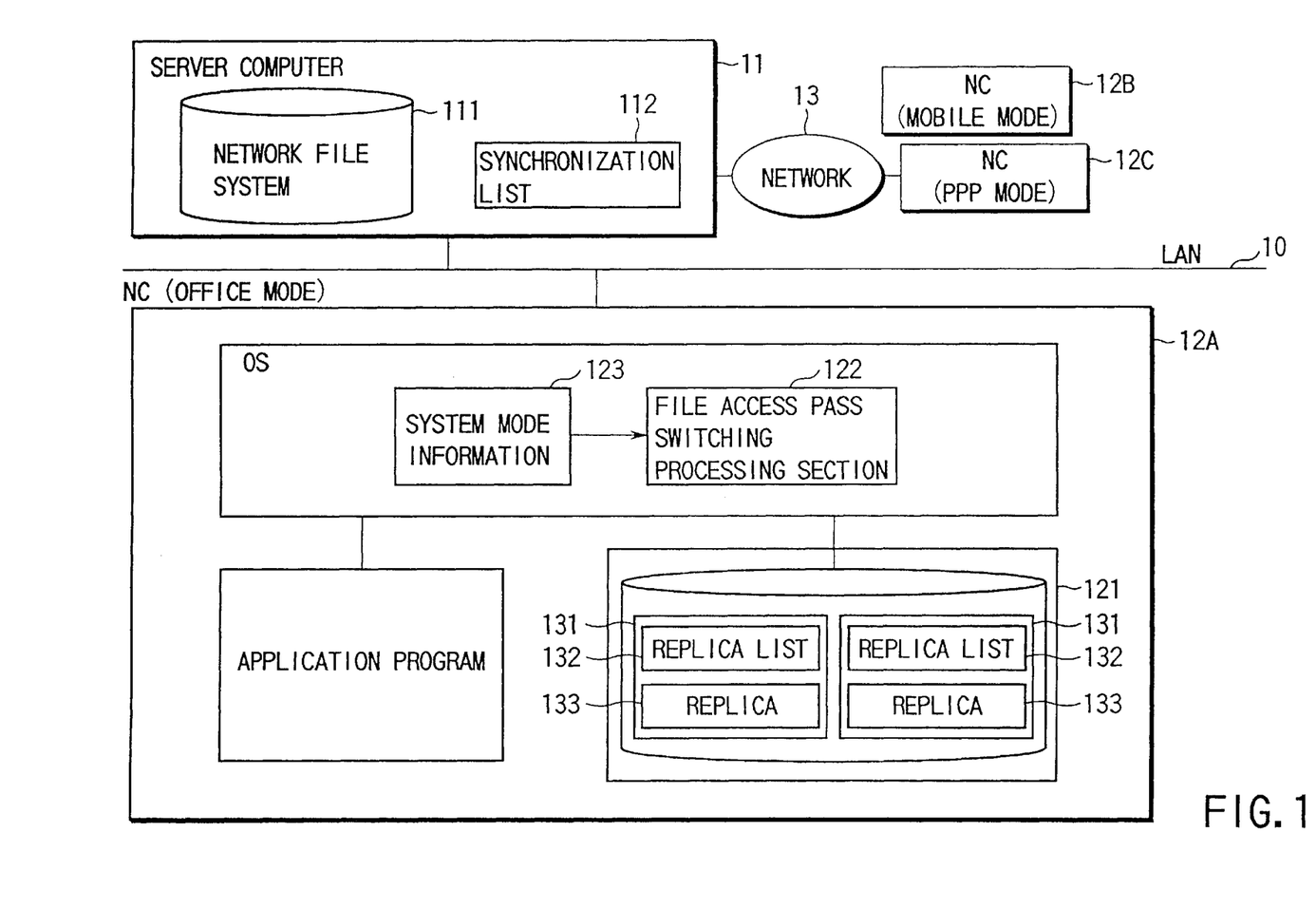
FIG. 1 is a block diagram showing an example of the system arrangement of a computer system in accordance with an embodiment of the present invention.

A network computer (NC) 12 (reference numeral 12 represents NCs 12A, 12B and 12C shown in FIG. 1) operates upon downloading all programs and data, such as an Operating System (OS) and application programs, necessary for data processing from a server (server computer) 11 via a network 13 such as a LAN 10 or a public switched telephone network. The network computer 12 means a computer which operates as a client in the computer system in accordance with the present embodiment.

In the office, the network computer 12A is used, connecting to the LAN 10 (office mode).

Outside the office, the network computer 12B is basically used, disconnecting to the server 11 (mobile mode), but can be used remote-connecting to the server 11 via a network 13 like the network computer 12C by using the PPP (Point to Point Protocol), as needed (PPP mode).

The server 11 provides resources, such as programs and data, for each network computer 12 operating as a client machine. The server 11 also provides the function of a network file system 111 to be used by each network computer 12 operating as a client machine. The content of the network file system 111 is usually stored in a hard disk drive of the server 11. That is, the resources on the server 11 are provided to each network computer 12 by the network file system 111.

The network computer 12 has a local storage device 121 to perform operations in the offline state. Replicas 133 which are copies of the resources, such as programs and data of the server 11, are stored in the local storage 121. Which resource is downloaded to the network computer 12 as a replica 133 is managed by a synchronization list 112 on the server 11.

The synchronization list 112, here, describes files for which data synchronization processing is performed to maintain data consistency between the server 11 and the local storage 121 of the network computer 12. This synchronization list 112 manages, for example, names of the files performing synchronization processing for each network computer 12.

When resources are downloaded to the network computer 12 to make replicas 133, a replica list 132 which is a copy of the synchronization list 112 is also downloaded and stored in the local storage 121. By using the replicas 133 stored in the local storage 121, the network computer 12 can operate without accessing the server 11. A nonvolatile storage device such as a flash memory card and a hard disk drive is used for the local storage 121.

A connected processing function and a disconnected processing function are prepared for the OS downloaded from the server 11 to the network computer 12. The connected processing function is for controlling the network computer 12 in a network operation mode in which the network computer 12 operates accessing the server 11. On the other hand, the disconnected processing function enables the network computer 12 to operate in the offline state in which the network computer is disconnected to the server 11 using the local storage 121.

Furthermore, the OS comprises a file access pass switching processing section 122 for switching file systems to be used in accordance with system mode information 123 indicating the operation mode (such as an office mode, a mobile mode and a PPP mode) of the network computer 12. The file access pass switching processing section 122 selectively allocates the network file system 111 on the server 11 and a local file system which consists of replicas 133 and their administration information and which is stored in the local storage 121 of the network computer 12, to the network computer 12.

When the network computer 12 accesses a file system, the network computer 12 changes the file system to be accessed in accordance with the state of connection of the network computer 12 to the network. In the office mode, the network computer 12 accesses the network file system 111 provided by the server 11. In the mobile mode, the network computer 12 accesses the local file system which is a copy of the network file system 111 and which is stored in the local storage 121. In the PPP mode, the network computer 12 accesses the local file system basically as in the case of the mobile mode. However, if a local file system is not made in the local storage 121, the network computer 12 accesses the server 11.

Next, the basic operation mode of the network computer 12 according to the present embodiment will be explained.

The disconnected operation mode designed for use in the offline state supports the above-mentioned mobile mode. It is designed to use the replicas 133 of the resources on the server 11. A specific storage area in which replicas 133 are stored in the local storage 121 is called "Daypack" 131. Specifically, the Daypack 131 is located in the local storage 121 and is a specific storage area which stores programs and data necessary for users to use the network computer 12 in the mobile mode.

If replicas 133 of the programs and data of the server 11 necessary for the operation in the mobile mode are downloaded in advance to the Daypack 131 from the server 11, the same operation performed in the network operation mode (office mode or PPP mode) can be continuously performed even after the mode shifts to the disconnected operation mode.

Also in the network operation mode, the Daypack 131 may be used to make replicas 133 of the resources on the server 11 to prepare for the operation in the offline state.

Accordingly, the following five connection modes are conceivable for the network computer 12.

Connection Modes of the Network Computer

Office Mode
(1) LAN & Daypack mode
(2) LAN mode (Daypack is not used)

Mobile Mode
(3) Daypack mode
(4) PPP & Daypack mode
(5) PPP mode (Daypack is not used)

The office modes are divided into (1) and (2) modes. The mobile modes are divided into (3) to (5) modes. Usually, however, only (3) and (4) modes are used as a mobile mode and (5) mode is not used. Therefore, four types of connection modes (1) to (4) are actually used.

Figure 2:
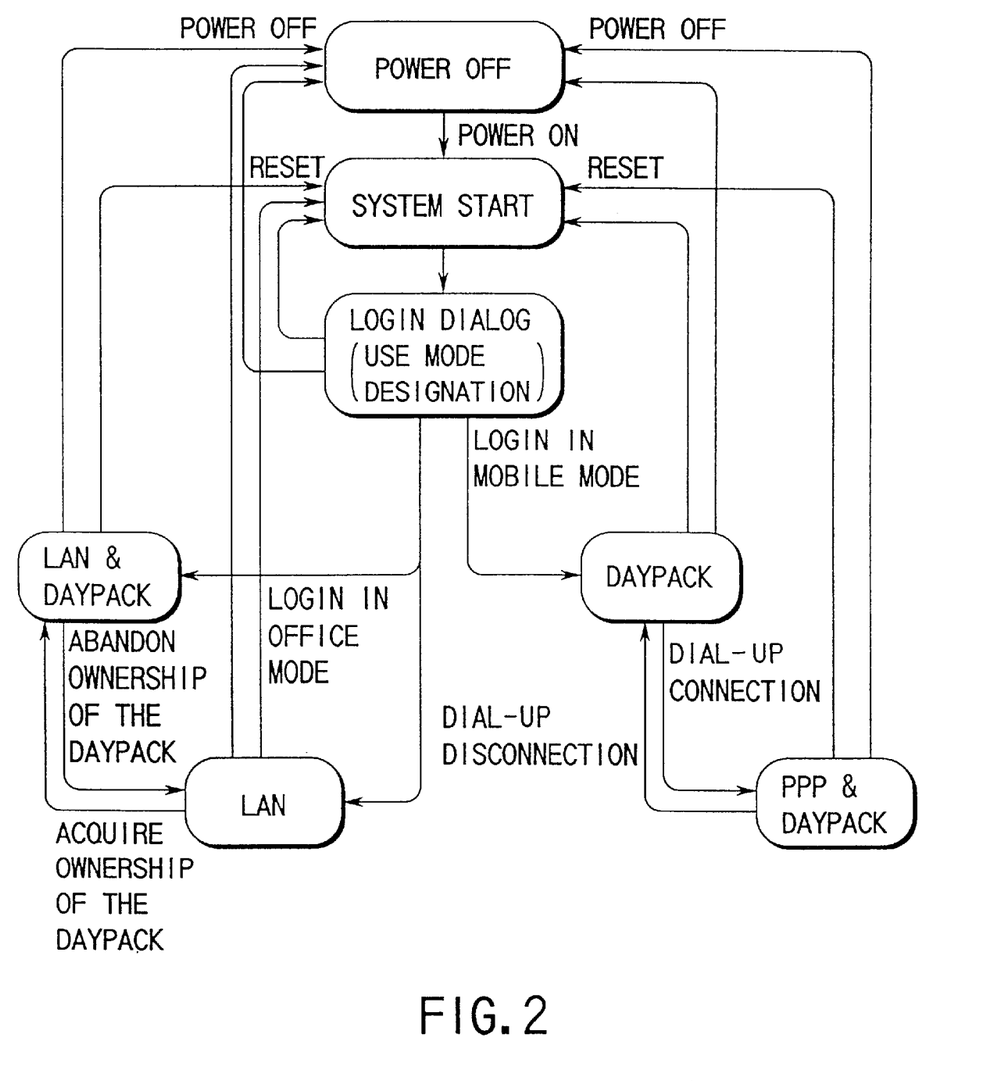
FIG. 2 is a flow chart showing the shift of the connection modes of a network computer in accordance with the present embodiment.

FIG. 2 shows the transition of these connection modes.

When the network computer 12 is powered on from a power-off state or reset in a power-on state, initialization processing by the OS starts (system starts). In login processing for causing the network computer 12 to obtain environment necessary for the operation from the server 11, a login dialog is displayed on the screen of the network computer 12, and an operation mode to be used is selected on the login dialog. The operation mode to be used is roughly divided into the "office mode" and the "mobile mode" described above.

The "office mode" is a mode designed for use in the office where the LAN can be used. When the "office mode" is selected, the LAN mode or the LAN & Daypack mode is set as a connection mode.

The "mobile mode" is a mode designed for use outside the office where the LAN cannot be used. When the "mobile mode" is selected, the Daypack mode or the PPP & Daypack mode is set as a connection mode.

The mechanism for selecting and shifting these modes to be used is incorporated in the OS initialization processing.

The connection modes will be described in detail below.

(a) Use of Daypack 131 in LAN Mode

When a Daypack 131 whose ownership is held by the user exists in the LAN mode, the LAN & Daypack mode is automatically set. The connection mode does not shift to the LAN mode although the Daypack 131 whose ownership is held by the user exists.

In the LAN & Daypack mode, the user can abandon the ownership of the Daypack 131 at any time. If the user abandons it, the connection mode shifts to the LAN mode.

In the LAN mode, if a Daypack 131 whose ownership is not held by anyone exists, the user can acquire the ownership of the Daypack 131. If the user acquires it, the connection mode shifts to the LAN & Daypack mode.

(b) Use of PPP in Daypack Mode

In the Daypack mode, the user can start using the PPP (Point to Point Protocol) at any time. If the user starts using it, the connection mode shifts to the PPP & Daypack mode.

To the contrary, in the PPP & Daypack mode, the user can stop using the PPP at any time. If the user stops using it, the connection mode shifts to the Daypack mode. When the PPP is used, the network computer 12 is connected to the server 11 via a network 13 such as a public switched telephone network, for example, a switched telephone network or a portable telephone network.

(c) Use of PPP Mode

The PPP mode without using the Daypack 131 is not used. To shift the connection mode to the PPP mode, the network computer must be PPP-connected. For this purpose, the user must directly input various setting information necessary for dial-up.

On the other hand, in the PPP & Daypack mode, various setting information necessary for dial-up can be stored in the Daypack 131 because this mode shifts from the Daypack mode. This information can be stored in the server 11 in advance.

Considering mobile uses, no problem arises if the use of the PPP is limited in using the Daypack 131.

(d) Reset and Power-off

In all modes, the network computer can be reset and powered off. The "reset" means initializing the data section of the OS and executing a system initialization routine. The "power-off" means turning off the hardware power supply.

The flow of processing in OS activation will be described with reference to the flow chart of FIG. 3.

When the network computer 12 is powered on or rebooted, the boot program stored in the ROM of the network computer 12 starts. In step S101, the boot program in the ROM first checks whether the OS is stored in the local storage 121.

If Yes in step S101, the OS is booted from the local storage 121 in step S102. If No in step S101, the boot program in the ROM automatically obtains the OS name, the IP address, and the minimum boot environment required for activating the OS by the DHCP (Dynamic Host Configuration Protocol) in step S103. In step S104, the boot program loads a boot loader from the server 11 by the TFTP (Trivial File Transfer Protocol) and transfers the control to the boot loader.

In step S105, the boot loader loads the OS from the server 11 by the NFS (Network File System) and boots the OS. In step S106, OS initialization processing starts. In this initialization processing, the network environment used by the OS, and the like are set.

After environment setting processing is finished, use mode selection processing is performed in step S107.

In the use mode selection processing, the OS checks whether a Daypack 131 whose ownership has been set exists, and whether the LAN 10 can be used. The default value of the use mode is determined on the basis of the check results. The default value is displayed on the login dialog display of the network computer 12.

In this use mode selection processing, whether a Daypack 131 whose ownership has been set exists in the local storage 121 is first checked. If Yes, the "mobile mode" is set as a default value of the use mode. Next, the DISCOVER packet of the DHCP is broadcast, and whether the LAN can be used is checked based on whether an OFFER packet is received or not. If the OFFER packet is received, the environment is determined to be one where the LAN can be used. The default value of the use mode is changed to the "office mode". In this manner, when the local storage 121 having the Daypack 131 whose ownership has been set by the user exists, the "mobile mode" or "office mode" is displayed as a default value on the login dialog display in accordance with whether the LAN can be used. If the user explicitly changes the setting of the mode on the login dialog display, the mode changes to the mode set by the user. When the user presses the OK button on the login dialog display to confirm the current mode, processing for setting the mode starts. An indicator indicating the mode is displayed on the screen. On the other hand, if no local storage 121 exists, or no ownership has been set in the Daypack 131 though the local storage 121 exists, then whether the LAN can be used is checked while the default mode is undetermined. When the environment is determined to be one where the LAN can be used, the "office mode" is set as a default value of the use mode, the "office mode" is displayed as a default value on the login dialog display, and the "mobile mode" is invalidated. As described above, when no local storage 121 exists or no ownership has been set in the Daypack 131 though the local storage 121 exists, the "office mode" is basically selected.

When the use mode is selected in the use mode selection processing, user authentication processing is performed using a user name, a password, and the like input on the login dialog in step S108 or S110. In the login processing, the file system is selected and allocated in accordance with the current use mode. When the user authentication processing is successfully made, and the "office mode" is selected, then the LAN mode or the LAN & Daypack mode is set as a connection mode based on the presence/absence of the ownership of the Daypack 131 in step S109.

On the other hand, when the "mobile mode" is selected, the Daypack mode or the PPP & Daypack mode is set in accordance with PPP connection and disconnection operation made by the user. When the connection mode shifts, the file system is selected and allocated in accordance with PPP connection and disconnection operations made by the user.

File Resources Switching Processing

Next, the file resources switching processing to be used, which is a characteristic feature of the present embodiment, will be explained.

(1) The Method of Designating File Resources

Generally, in order to access a specific file existing in the file system, the file is designated using a file access pass. The file access pass is expressed by a character string dividing the name of a parent directory, in which the file is stored, by a separator.

Figure 4A:
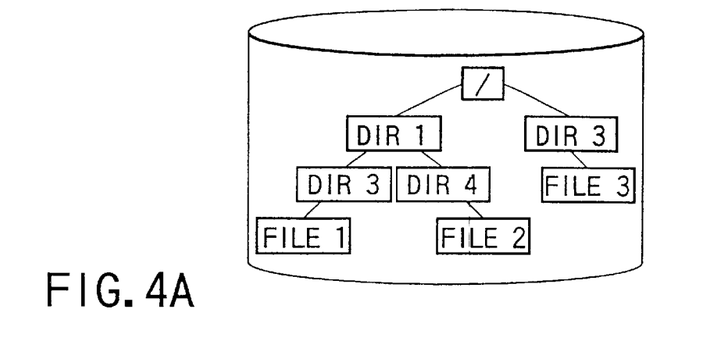
FIGS. 4A and 4B are views for explaining the principle of the method of designating the file resource used in the network computer in accordance with the present embodiment.

In FIG. 4A, for example, if the network computer 12 accesses FILE2, its file access pass is expressed as "/DIR1/DIR4/FILE2" where its parent directories DIR1 and DIR4 are divided by a separator. This way of expressing a file access pass is applied to not only the network file system but also the local file system.

In accordance with the present embodiment, in the OS used by downloading to the network computer 12, a file system is mounted to a specific prefix. The prefix is used as a part of a file access pass, thereby making it possible to access a plurality of file systems using a series of file access passes.

Figure 4B:
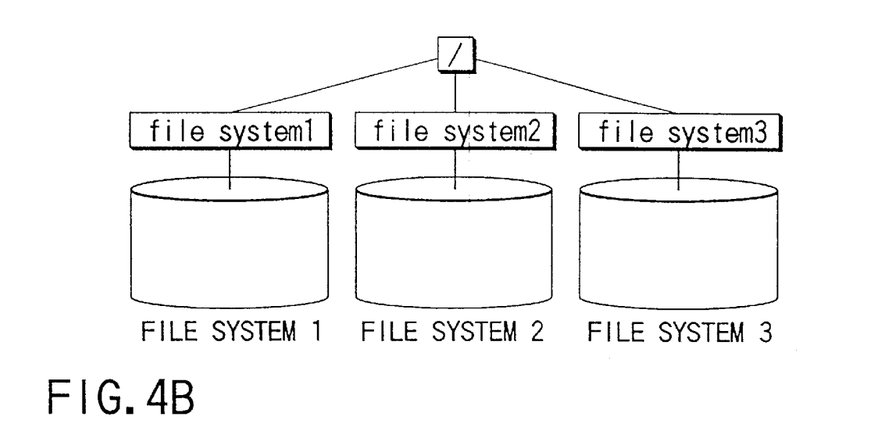

To be specific, as shown in FIG. 4B, file resources of FILE SYSTEM 1 can be accessed by adding the prefix "/file system1" just before the file access pass for file resources within the FILE SYSTEM 1. Likewise, file resources of FILE SYSTEM 2 and those of FILE SYSTEM 3 can be accessed by adding the prefix "/file system2" and the prefix "/file system3" just before their file access passes, respectively.

Thus, use of file access passes to which prefixes are added allows access to a plurality of different file systems. In this case, however, switching to a different file system requires explicit designation by a prefix. Users or application programs of the network computer 12 request file access using an inner file access pass common to the file systems basically without being aware of a prefix. Switching to a different file system using a prefix is automatically made by the OS.

(2) Switching of File Resources

A user home directory which users and application programs of the network computer 12 use is mounted to a prefix "/HOME" after log-on processing is completed. All of the application programs which operate on the network computer 12 are mounted in this manner. The user home directory means a directory for work allotted to each user. In a system environment where a plurality of networks operate, a directory which can be freely read and written is usually made for each user in this manner. In this case, each network computer 12 is limited to access only files under its corresponding user home directory.

1. Switching of File Resources in the Office Mode

Figure 5:
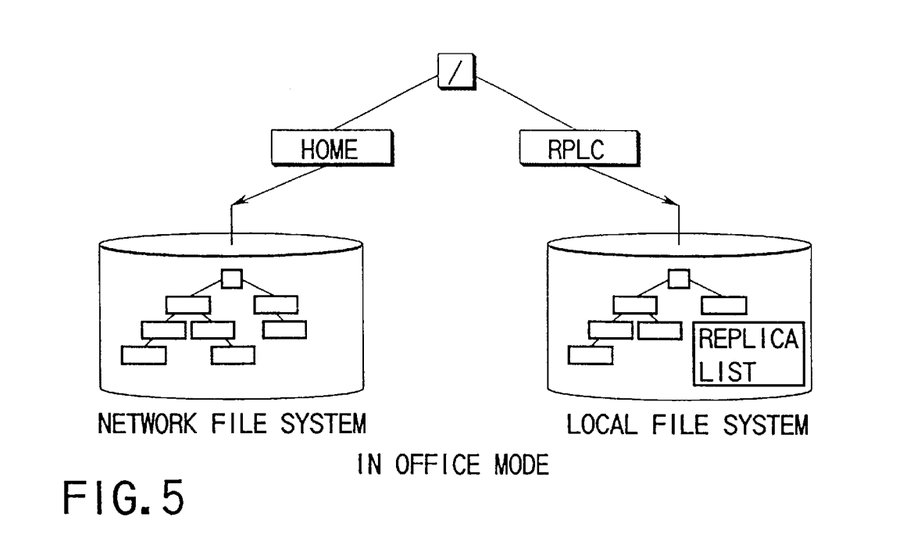
FIG. 5 is a view showing how the file system is mounted when the network computer is in an office mode in accordance with the present embodiment.

As shown in FIG. 5, in the office mode, the network file system provided by the server 11 is mounted to the prefix "/HOME". The local file system of the local storage 121 used for making a replica 133 of the content of this user home directory is mounted to the prefix "/RPLC". The prefix "RPLC" is a prefix for designating the local file system, that is, the replica 133.

In making the replica 133, the local file system is accessed using this prefix. Since it takes much time to make replicas 133 corresponding to all files on the network file system, only those which are considered to be necessary in the mobile mode are created. A list of the replicas 133 made is stored in the local storage 121 as a replica list 132.

2. Switching of File Resources in the Mobile Mode

Figure 6:
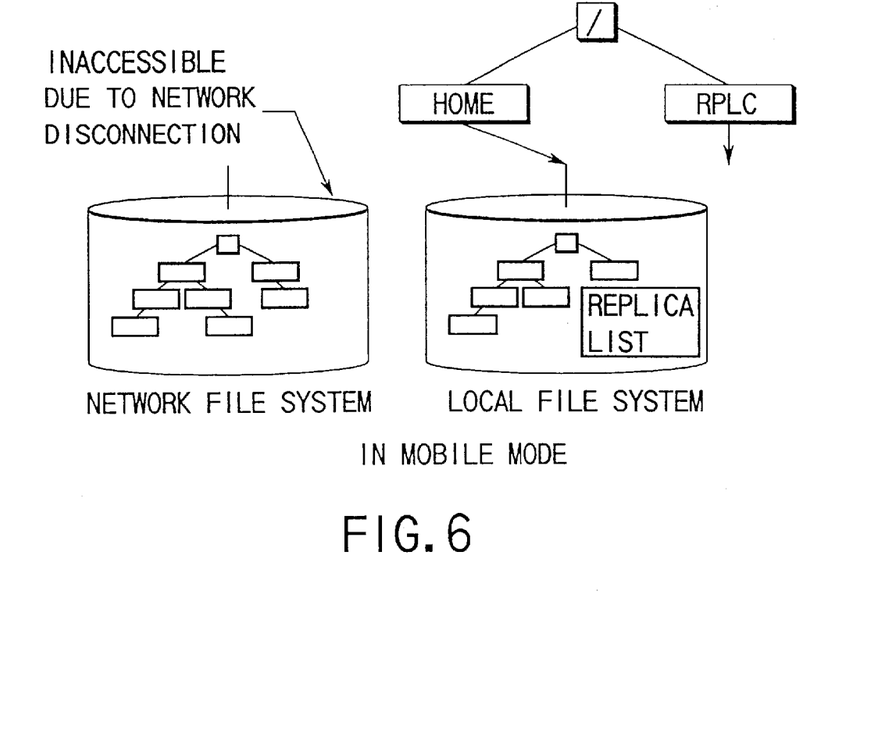
FIG. 6 is a view showing how the file system is mounted when the network computer is in a mobile mode in accordance with the present embodiment.

Access to the network file system can not be made in the mobile mode. For that reason, as shown in FIG. 6, the file system mounted to the prefix "/HOME" is switched from the network file system to the local file system in which replicas 133 of the resources on the sever 11 are stored in the mobile mode. The replicas 133 of the server resources which have been made in advance can be then accessed. This switching processing is automatically executed by a file access pass switching processing section 122 in the OS. The application program does not have to be aware of the switching processing. Therefore, access to the replicas 133 of the local file system can be made using file access passes which are exactly the same as those used at network connection. The application program which operates on the network computer 12 in the mobile mode does not have to change processing procedures in accordance with states of the connection/disconnection of the network computer 12 to the network.

It is noted, however, that the local file system does not have replicas 133 of all files on the network file system as described above and cannot access files whose replicas have not been made.

3. Switching of File Resources in the PPP Mode

Figure 7:
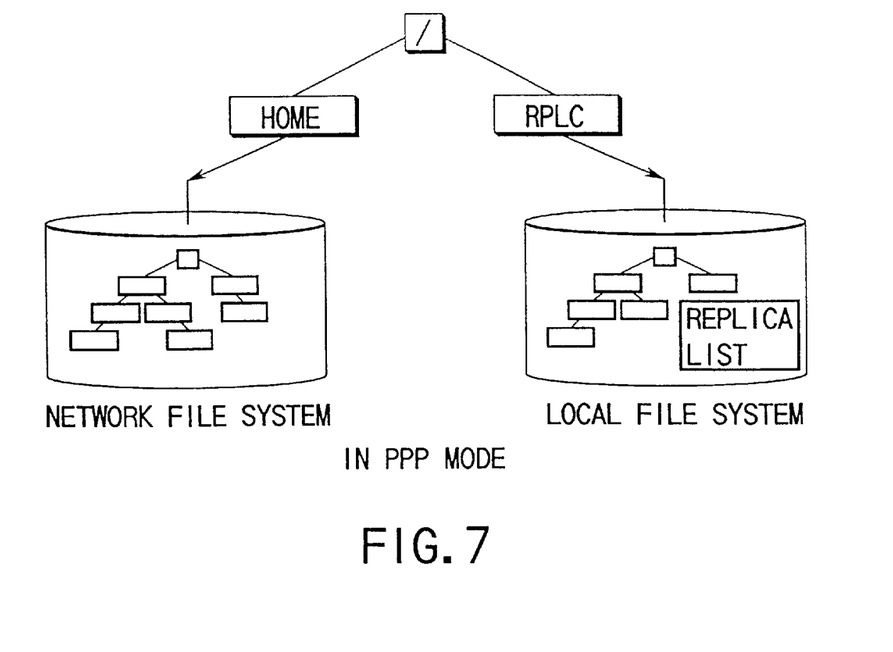
FIG. 7 is a view showing how the file system is mounted when the network computer is in a PPP mode in accordance with the present embodiment.

In the PPP mode, the network computer 12 can access the server 11 via a network 13. However, the communication speed in the PPP mode is lower than in the office mode when the network computer 12 accesses the server 11 via the LAN 10. Therefore, when replicas 133 have been made on the local file system, the network computer 12 basically accesses the local file system as in the case of in the mobile mode. On the other hand, when the replicas have not been made, the network computer 12 accesses the network file system on the server 11 via a network 13.

Specifically, as shown in FIG. 7, the network file system and the local file system are mounted to the prefixes "/HOME" and "/RPLC", respectively in the PPP mode as in the case of the office mode.

The following respects differ in access procedures between the PPP mode and the office mode. In the PPP mode, when the network computer 12 accesses a file, the network computer determines whether the replica 133 of the file requested to access exists in the local file system referring to the replica list 132 and processing of switching the file system to be accessed is then performed. This switching processing is automatically performed by the file access pass switching section 122 of the OS. The application program, therefore, does not have to be aware of the processing.

Figure 8:
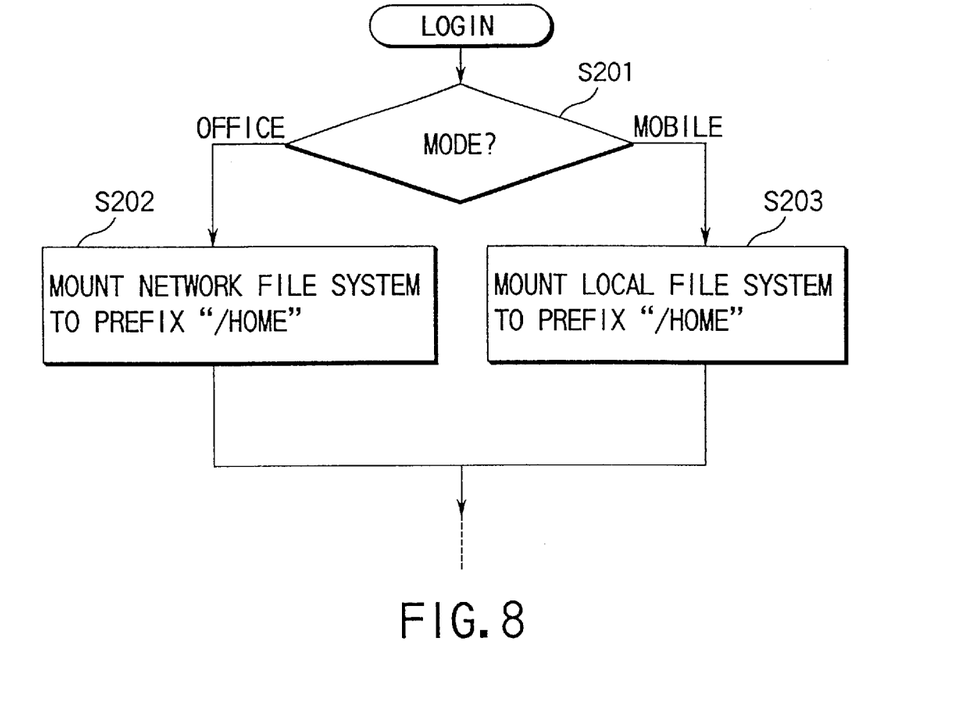
FIG. 8 is a flow chart showing allocation switching procedures of the file system in the network computer in accordance with the present embodiment.

Next, with reference to FIG. 8, the allocation switching processing by which a file system to be allocated to the network computer 12 is switched will be explained.

Figure 3:
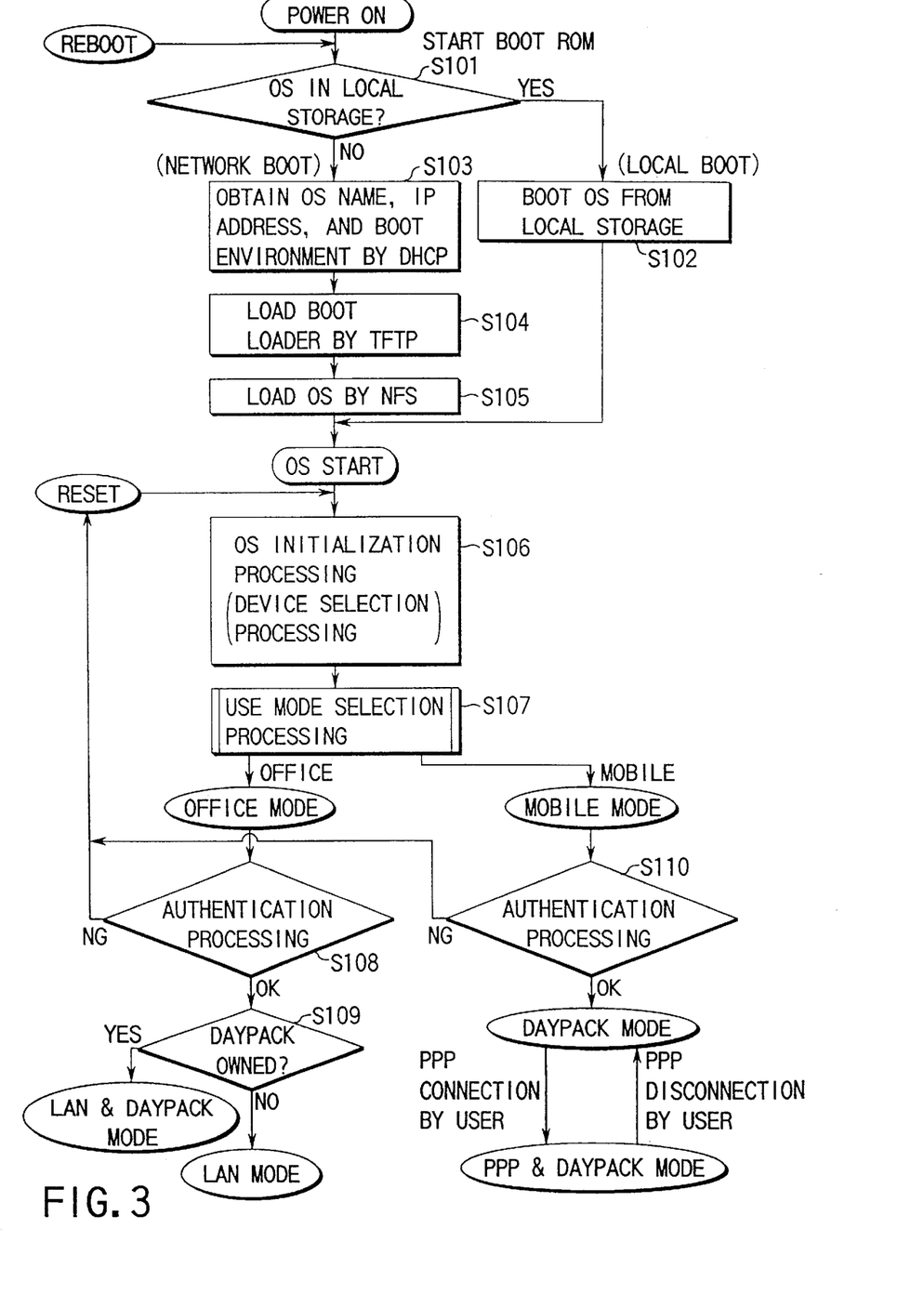
FIG. 3 is a flow chart showing the procedures of the OS activation processing applied to the network computer in accordance with the present embodiment.

The allocation switching processing is automatically performed by the OS at the time of the login in authentication processing in steps S108 and S110 shown in FIG. 3. First, in step S201, with reference to system mode information 123, a use mode selected in use mode selection processing is checked. It is then determined whether the use mode is an office mode or a mobile mode. As described above, basically, the use mode is an office mode when the network computer 12 is in the online state in which it is connected to LAN 10 and a mobile mode when the network computer 12 is in the offline state in which it is not connected to the LAN 10.

In the office mode, the OS mounts the network file system to the prefix "/HOME" and the local file system to the prefix "/RPLC" respectively in step S202. As a result, all file access from the application programs is made to the network file system. Access to the local file system using the prefix "/RPLC" is performed by the OS in order to make a replica and to perform synchronization processing to maintain data matching between the replicas and the server resources.

On the other hand, in the mobile mode, the OS mounts the local file system to the prefix "/HOME" but does not mount anything to the prefix "/RPLC" in step S203. As a result, all file access from the application programs is made to the local file system.

Figure 9:
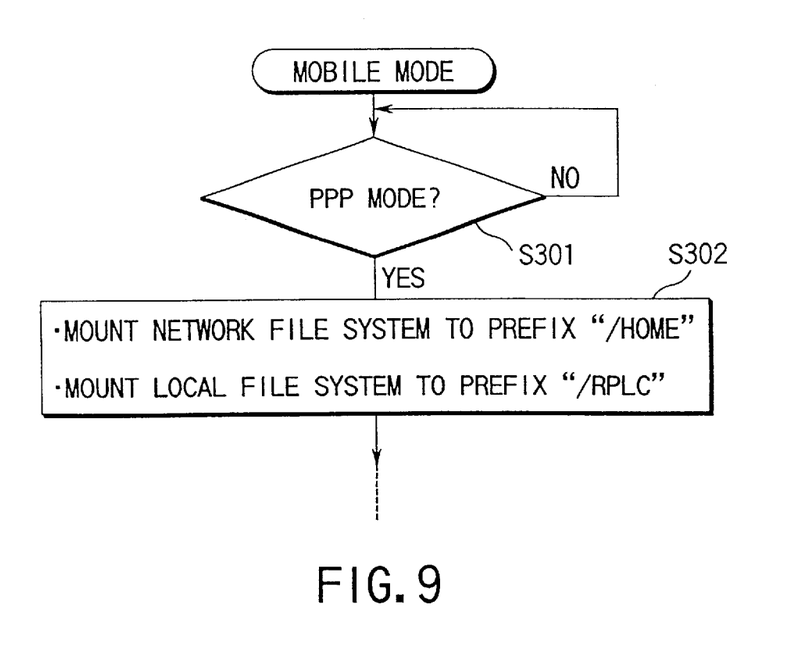
FIG. 9 is a flow chart showing allocation switching procedures of the file system in the network computer in a PPP mode in accordance with the present embodiment.

As shown in the flow chart of FIG. 9, when the use mode is shifted from the mobile mode to the PPP mode, file system allocation switching processing is performed by the OS.

Specifically, when the user performs PPP connection while the "mobile mode" is selected, the use mode is shifted from the mobile mode to the PPP mode. If the shift to the PPP mode is detected in step S301, in step S302 the OS mounts the network file system to the prefix "/HOME" and the local file system to the prefix "/RPLC" respectively as in the office mode.

Figure 10:
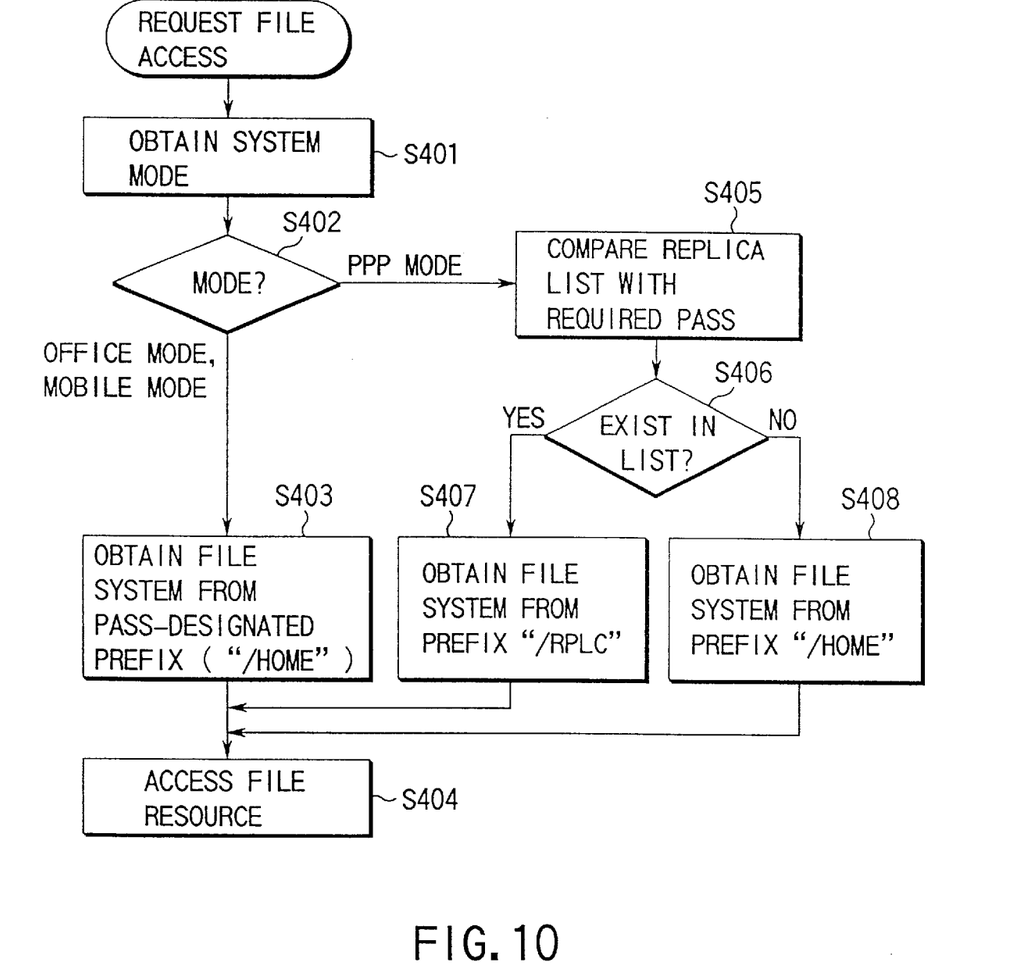
FIG. 10 is a flow chart showing switching procedures of the file system to be accessed and used in the network computer in accordance with the present embodiment.

Next, processing made by the OS in response to a file access request will be explained with reference to the flow chart of FIG. 10.

A file access request from application programs or users of the network computer 12 is made by using the file access pass for files within the file system as stated above. In response to the file access request, the OS first obtains system mode information 123 in step S401 and then determines the current use mode in step S402.

In the office mode or mobile mode, the OS selects the file system mounted to the prefix "/HOME" in step S403. Then, in step S404, the file resource designated by the prefix "/HOME"+a file access pass is accessed.

In the office mode, since the network file system is mounted to the prefix "/HOME", a corresponding file on the server 11 is accessed. In the mobile mode, since the local file system is mounted to the prefix "/HOME", a corresponding file on the local storage 121 is accessed.

In the PPP mode, the OS compares the replica list 132 in the local storage 121 with the file access pass of the file requested to access and checks whether the file requested to access exists in the replica list 132 in step S405. In step S406, it is determined whether the replica 133 of the file requested to access exists in the local storage 121.

If the replica of the file resource requested to access exists in the local storage 121, the OS selects the file system mounted to the prefix "/RPLC" in step S407. In step S404, the file resource designated by the prefix "/RPLC"+the file access pass is accessed. In the PPP mode, since the local file system is mounted to the prefix "/RPLC", the corresponding file resource on the local storage 121 is accessed.

On the other hand, if the replica 133 of the file resource requested to access does not exist in the local storage 121, the OS selects the file system mounted to the prefix "/HOME" in step S408. In step S404, the file resource designated by the prefix "/HOME"+the file access pass is accessed. In the PPP mode, since the network file system is mounted to the prefix "/HOME", the corresponding file resource on the server 11 is accessed.

As described above, in accordance with the present embodiment, the file system to be allocated is automatically switched in accordance with whether the network computer 12 which can operate in the mobile environment is in the online state or in the offline state. Users or application programs of the network computer 12, therefore, does not have to be aware of the file system to be accessed and can use a common file access pass to both the resources on the server 11 and the replicas 133 in the local storage 121. As a result, the operation which uses the file resources on the server 11 in the online state can be performed and the operation which uses the replicas 133 stored in the local storage 121 in the offline state can be performed.

Furthermore, in the PPP mode, the file system to be accessed is automatically switched depending on whether the file resource designed to access by the file access pass included in the file access request from users or application programs exists in the local storage 121. As a result, file access via a network 13 is only limited to a case where the file resource to access does not exist in the local storage 121, and thereby the high-speed operation of the network computer 12 can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network computer adapted to be connected to a server computer and operating upon downloaded programs and data necessary for data processing from said server computer, comprising:
   a local storage device in which at least a part of resources including said programs and data stored in a file system of said server computer are stored as a replica;
   means for downloading an operating system from said server computer if the operating system is not stored in said network computer;
   determination means for determining a connection state of said network computer to said server computer and whether or not the replica is stored in said local storage device;
   access pass allocation means for allocating a file access pass such that said network computer accesses the file system of said server computer or a local file system stored as the replica in said local storage device in accordance with the determination result made by said determination means.

2. A network computer according to claim 1, wherein said file access pass allocation means allocates the file access pass such that said network computer accesses the file system of said server computer, when said determination means determinates that said network computer is in an online connection state and that the replica is stored in said local storage device.

3. The network computer according to claim 1, wherein said file access pass allocation means allocates the replicas stored in said local storage device to said network computer using the same file access pass name as a file access pass name used for accessing the file system in said server computer, when said determination means determines that said network computer is in an offline connection state.

4. The network computer according to claim 2, wherein the file access pass allocation by said file access pass allocation means is automatically performed by the operating system of said network computer.

5. A network computer adapted to be connected to a server computer and operating upon downloaded programs and data necessary for data processing from said server computer, comprising:
   a local storage device in which at least a part of resources including said programs and data stored in a file system of said server computer are stored as a replica;
   means for downloading an operating system from said server computer if the operating system is not stored in said network computer;
   determination means for determining a connection state of said network computer to said server computer and whether or not the replica is stored in said local storage device;
   directory mount control means for mounting the file system of said server computer as a home directory of file resources and mounting the replica stored in said local storage device as a replica directory of the file resources when said determination means determines that said network computer is in an online connection state;
   file access means for accessing the file system of said server computer or the replica stored in said local storage device using said home directory or said replica directory.

6. The network computer according to clam 5, wherein said directory mount control means mounts the replica stored in said local storage device to said home directory of the file resources and nothing to said replica directory, when said determination means determines that said network computer is in an offline connection state.

7. The network computer according to claim 6, wherein the file system of said server computer is accessed by using said home directory when said determination means determines that said network computer is in the online connection state and the replica stored in said local storage device is accessed by using said home directory when said determination means determines that said network computer is in the offline connection state.

8. A network computer adapted to be connected to a server computer and operating upon downloaded programs and data necessary for data processing from said server computer comprising:
   a local storage device in which at least a part of resources including said programs and data stored in a file system of said server computer are stored as a replica;
   means for downloading an operating system from said server computer if the operating system is not stored in said network computer;
   determination means for determining a connection state of said network computer to said server computer and whether or not a software to be accessed is included in the replica;
   directory mount control means for mounting the file system of said server computer to a home directory of file resources and mounting the replica stored in said local storage device to a replica directory of the file resources, when said determination means determines that said network computer is in a PPP connection;
   file access means for accessing the replica stored in said local storage device or the file system of said server computer using the home directory or the replica directory in accordance with a determination result made by said determination means.

9. The network computer according to claim 8, wherein said file access means accesses the replica stored in said local storage device using said replica directory, when said determination means determines that said software to be accessed is included in the replica.

10. The network computer according to claim 8, wherein said file access means accesses the file system of said server computer using said home directory, when said determination means determines that said software to be accessed is not included in the replica.

11. The network computer according to claim 8, wherein said operating system includes a file access pass switching function for switching file access passes between a file access pass for accessing the replica stored in said local storage device and a file access pass for accessing the file system of said server computer.

12. A file resource switching method, applied to a network computer, said network computer having a local storage device in which at least a part of resources including programs and data stored in a file system of a server computer are stored as a replica by downloading the resources from said server computer, the method comprising:

a step of downloading an operating system from said server computer if the operating system is not stored in said network computer;

a step of determining a connection state of said network computer to said server computer and whether or not the replica is stored in said local storage device;

a step of selectively allocating a file access pass accessing the file system of said server computer and a file access pass accessing the replica stored in said local storage device to said network computer in accordance with the determination result made by said determining step.

13. The method according to claim 12, wherein said step of selectively allocating the file access pass comprising the substeps of:

selecting the file access pass accessing the file system of said server computer by allocating the file system of said server computer to said network computer, when said determination step determines that said network computer is in an online connection state and that the replica is stored in said local storage device; and allocating the replica stored in said local storage device to said network computer using the same file access pass name as a file access pass name used for accessing the file system in said server computer, when said determination step determines that said network computer is in an offline connection state.

14. A file resource switching method, applied to a network computer, said network computer having a local storage device in which at least a part of resources including programs and data stored in a file system of a server computer are stored as a replica by downloading the resources from said server computer, the method comprising:

a step of downloading an operating system from said server computer if the operating system is not stored in said network computer;

a determination step of determining a connection state of said network computer to said server computer and whether or not the replica is stored in said local storage device;

a step of mounting the file system of said server computer to a home directory of file resources and mounting the replica stored in said local storage device to a replica directory of the file resources, when said determination step determines that said network computer is in an online connection state;

a step of accessing the file system of said server computer or the replica stored in said local storage device using said home directory or said replica directory.

15. The method according to claim 14, wherein said step of mounting the file system comprising a substep of mounting the replica stored in said local storage device to said home directory of said file resources and nothing to said replica directory, when said determination step determines that said network computer is in an offline connection state.

16. The method according to claim 14, wherein the file system of said server computer is accessed by using said home directory when said determination step determines that said network computer is in the online connection state; and the replica stored in said local storage device is accessed by using said home directory when said determination step determines that said network computer is in the offline connection state.

17. A file resource switching method, applied to a network computer, said network computer having a local storage device in which at least a part of resources including programs and data stored in a file system of a server computer are stored as a replica by downloading the resources from said server computer, the method comprising:

a step of downloading an operating system from said server computer if the operating system is not stored in said network computer;

a step of determining a connection state of said network computer to said server computer and whether or not a software to be accessed is included in the replica;

a step of mounting the file system of said server computer to a home directory of file resources, and mounting the replica stored in said local storage device to a replica directory of the file resources, when said determining step determines that said network computer is in a PPP connection state;

a step of accessing the replica stored in said local storage device or the file system of said server computer using the home directory or the replica directory.

18. The method according to claim 17, wherein said step of accessing the replica or the file system comprises substeps of accessing the replica stored in said local storage device using said replica directory, when said determination step determines that said software to be accessed is included in said replica, and accessing the file system of said server computer using said home directory, when said determination step determines that said software to be accessed is not included in said local storage device.

* * * * *

UNITED STATES PATENT AND TRADEMARK OFFICE
CERTIFICATE OF CORRECTION

PATENT NO. : 6,269,371 B1
DATED : July 31, 2001
INVENTOR(S) : Hajime Ohnishi

It is certified that error appears in the above-identified patent and that said Letters Patent is hereby corrected as shown below:

Column 11, claim 2,
Line 35, "determinates" should read -- determines --.

Column 12, claim 6,
Line 9, "clam 5" should read -- claim 5 --.

Signed and Sealed this

Second Day of April, 2002

Attest:

JAMES E. ROGAN
Attesting Officer
Director of the United States Patent and Trademark Office